US007285320B2

(12) United States Patent
Nigam

(10) Patent No.: US 7,285,320 B2
(45) **Date of Patent: *Oct. 23, 2007**

(54) PREPARATION OF IMAGES ON A SUBSTRATE SURFACE UTILIZING AN OPAQUE COATING COMPOSITION THAT BECOMES TRANSPARENT UPON PRINTING

(75) Inventor: Asutosh Nigam, Fremont, CA (US)

(73) Assignee: SRI International, Menlo Park, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/774,340

(22) Filed: Feb. 6, 2004

(65) Prior Publication Data

US 2004/0228966 A1 Nov. 18, 2004

Related U.S. Application Data

(62) Division of application No. 09/812,712, filed on Mar. 19, 2001, now Pat. No. 6,723,383.

(60) Provisional application No. 60/190,840, filed on Mar. 20, 2000.

(51) Int. Cl.
*B32B 15/04* (2006.01)
*B41M 5/00* (2006.01)

(52) U.S. Cl. ................ 428/195.1; 428/209; 428/211.1; 428/457; 427/156; 427/331; 427/336; 427/337; 427/402; 427/407.1; 427/409

(58) Field of Classification Search ................ 427/261, 427/333, 337, 156, 331; 428/457, 195.1
See application file for complete search history.

(56) References Cited

U.S. PATENT DOCUMENTS

| | | | | |
|---|---|---|---|---|
| 4,154,618 | A | 5/1979 | Burke | 106/31.67 |
| 4,233,195 | A | 11/1980 | Mills | 524/441 |
| 4,252,601 | A | 2/1981 | Ceintrey | 216/24 |
| 4,499,211 | A | 2/1985 | Walch et al. | 521/145 |
| 4,810,562 | A | 3/1989 | Okawa et al. | 428/199 |
| 5,106,126 | A | 4/1992 | Longobardi et al. | 283/94 |
| 5,163,846 | A | 11/1992 | Lee | 434/408 |
| 5,370,976 | A | 12/1994 | Williamson et al. | 430/358 |
| 5,468,532 | A | 11/1995 | Ho et al. | 428/40.9 |
| 5,564,843 | A | 10/1996 | Kawaguchi | 400/208 |
| 5,656,331 | A | 8/1997 | Kline | 427/258 |
| 5,662,738 | A | 9/1997 | Schmid et al. | 106/404 |
| 5,733,634 | A | 3/1998 | Karel | 428/195 |
| 5,766,335 | A | 6/1998 | Bujard et al. | 106/404 |
| 5,912,283 | A | 6/1999 | Hashizume et al. | 106/413 |
| 6,171,444 | B1 | 1/2001 | Nigam | 162/158 |
| 6,197,383 | B1 | 3/2001 | Nigam | 427/391 |
| 6,197,880 | B1 | 3/2001 | Nigam | 524/845 |
| 6,241,787 | B1 | 6/2001 | Nigam | 8/543 |
| 6,291,023 | B1 | 9/2001 | Nigam | 427/389.9 |
| 6,364,993 | B1 | 4/2002 | Netsch et al. | 156/277 |
| 2001/0046824 | A1 | 11/2001 | Nigam | 427/256 |
| 2004/0109958 | A1 * | 6/2004 | Nigam et al. | 428/32.1 |

FOREIGN PATENT DOCUMENTS

| | | |
|---|---|---|
| EP | 0071169 | 2/1983 |
| EP | 0390638 | 10/1990 |
| GB | 1073433 | 6/1967 |
| GB | 1604488 | 12/1981 |
| JP | 10-157280 | 6/1998 |
| WO | WO81/01389 | 5/1981 |

OTHER PUBLICATIONS

U.S. Appl. No. 09/282,595, filed Mar. 31, 1999, Nigam.
U.S. Appl. No. 60/190,840, filed Mar. 20, 2000, Nigam.

* cited by examiner

*Primary Examiner*—Monique R. Jackson
(74) *Attorney, Agent, or Firm*—Isaac M. Rutenberg; Dianne E. Reed; Mintz, Levin, Cohn, Ferris Glovsky, and Popeo PC

(57) ABSTRACT

The present invention features processes and compositions for producing a metallic-looking image on a substrate having a reflective or luminescent surface. The process utilizes an opaque coating composition containing an opaque coating agent comprising a mixture of a polyacid and a polybase. When applied to a light-emitting, reflective or luminescent substrate, the opaque coating composition at least partially masks the light-emitting reflective or luminescent surface of the substrate, but becomes increasingly translucent or transparent when contacted with a recording liquid such as an ink, revealing the light-emitting, reflective or luminescent surface.

59 Claims, No Drawings

PREPARATION OF IMAGES ON A SUBSTRATE SURFACE UTILIZING AN OPAQUE COATING COMPOSITION THAT BECOMES TRANSPARENT UPON PRINTING

CROSS-REFERENCE TO RELATED APPLICATIONS

This application is a divisional of U.S. patent application Ser. No. 09/812,712, filed Mar. 19, 2001, now U.S. Pat. No. 6,723,383 allowed, which claims priority to provisional U.S. patent application Ser. No. 60/190,840, filed Mar. 20, 2000, both of which are incorporated by reference in their entirety.

TECHNICAL FIELD

The present invention relates generally to compositions and methods for preparing images on substrates having an opaque surface that becomes transparent upon printing. More particularly, the invention relates to utilizing such compositions and methods for the preparation of light-emitting, highly reflective, and/or metallic-looking images on glossy, light emitting, reflective or luminescent substrates. The invention also relates to dry substrates having light-emitting, highly reflective and/or metallic looking images prepared thereon.

BACKGROUND

Many methods have been used to produce a metallic-looking image on a substrate. For the most part, these methods involve the use of metallic pigments and metal-containing inks. U.S. Pat. No. 4,233,195 to Mills, U.S. Pat. No. 5,912,283 to Hashizume et al., U.S. Pat. No. 5,662,738 to Schmid et al., and U.S. Pat. No. 5,766,335 to Bujard et. al. describe pigments and ink formulations that incorporate metallic, usually aluminum, particles. While different approaches have been followed to provide enhanced color and pigment variation, the inks and pigments used are typically costly and require complicated and expensive procedures. For example, U.S. Pat. No. 5,370,976 to Williamson et al. describes a metallic color printing process wherein the image is produced using a four-color separation process, involving metallic gold and/or metallic silver separations, and an electronic masking system.

Other processes have been developed for producing a metallic-looking image without the use of metallic pigments. U.S. Pat. No. 5,656,331 to Kline, for example, describes a printed substrate having a metallic finish where the metallic appearance is achieved by applying a first layer having the desired final color pattern, a second layer comprising a moire dispersion pattern and a third coating of water pearl. Complex thermal processing methods have also been used. For example, U.S. Pat. No. 5,564,843 to Kawaguchi describes a method of producing a reflective image by printing the image on the surface of a film using a thermal print head and then affixing the film onto a reflective surface.

Reflective surfaces to form metallic-looking images have also been used, primarily in the marketing and display industries. U.S. Pat. No. 5,106,126 to Longobardi et al. describes a process for reverse printing on a transparent facing material such as a MYLAR® polyester sheet or a glass sheet. The printing must be done as a mirror image and the printing steps must be performed in an order that is the reverse of the order used in conjunction with conventional printing, making it difficult to use standard printing equipment without substantial modification. Also, this method is quite costly.

A more direct method is provided in U.S. Pat. No. 5,733,634 to Karel wherein a metallic-looking image is generated by first applying a coating of a white pigment to the surface of a reflective substrate, wherein the applied pigment has varying density across the surface, and then applying a coating of a colored pigment, also in varying density across the surface. Those surface areas having a lower density of white and colored pigments have a metallic-looking appearance, as the reflective substrate is visible through the coating layers. This method is effective, it requires a separate screened application of the white dots and is not suitable for use in conventional ink-jet printing or in any other consumer usable image production method.

Accordingly, there is a need in the art for a simple and inexpensive process for the printing of light-emitting, reflective or metallic-looking images.

SUMMARY OF THE INVENTION

The present invention features a novel process for producing a light-emitting, glossy, reflective or metallic-looking image utilizing opaque coating compositions on a reflective, glossy, or luminescent substrate wherein the original surface of the substrate is initially masked but, after contact with a recording liquid, becomes transparent, revealing the glossy, reflective or luminescent substrate through the contacted, coated area. The opaque coating compositions are composed of a mixture of a polyacid and a polybase and may be used to treat a substrate either during or after manufacture. Substrates treated with the present opaque coating compositions can be used to yield high quality light-emitting, glossy, reflective, or metallic-looking images.

It is a primary object of the invention to provide a method for producing a light-emitting, glossy, reflective or metallic-looking image comprising the steps of applying an opaque coating composition to the surface of a light emitting, glossy, reflective or luminescent substrate and contacting the coated substrate with a recording liquid, wherein the opaque coating comprises a mixture of a polyacid and a polybase.

Another object of the invention is to provide opaque coatings for the treatment of glossy, reflective or luminescent substrates, which provide a light-emitting, reflective, glossy, or metallic-looking image when contacted with a recording liquid.

A further object of the invention is to provide an opaquely coated reflective or luminescent substrate wherein the opaque coating provides a light-emitting, reflective, glossy, or metallic-looking image when contacted with a recording liquid.

Additional objects, advantages and novel features of the invention will be set forth in part in the description which follows, and in part will become apparent to those skilled in the art upon examination of the following, or may be learned by practice of the invention.

In a first embodiment, then, a process is provided for producing a light-emitting, reflective, glossy, or metallic-looking image comprising the steps of (1) applying an opaque coating composition to the surface of a substrate wherein the surface is selected from the group consisting of glossy surfaces, reflective surfaces and luminescent surfaces and (2) contacting the coated substrate with a recording liquid, wherein the opaque coating composition is such that it becomes transparent upon contact with a recording liquid.

In another embodiment of the invention, a substrate is provided having a surface selected from the group consisting of glossy surfaces, reflective surfaces and luminescent surfaces, coated with an opaque coating composition that becomes transparent upon contact with a recording liquid.

In a further embodiment of the invention, a process is provided for producing a light-emitting, glossy, reflective or metallic-looking image comprising the steps of (1) forming a preselected image or color scheme on top of the surface of a substrate having a surface selected from the group consisting of reflective surfaces and luminescent surfaces, (2) applying an opaque coating composition on top of the preselected image or color scheme, and (3) applying a recording liquid to the coated substrate, wherein the opaque coating composition becomes transparent upon contact.

In a still further embodiment of the invention, a substrate is provided having a surface selected from the group consisting of reflective surfaces, glossy surfaces, and luminescent surfaces, having a preselected image or color scheme on the surface and additionally coated with an opaque coating composition that becomes transparent upon contact with a recording liquid.

DETAILED DESCRIPTION OF THE INVENTION

I. Definitions and Overview

It must be noted that, as used in the specification and the appended claims, the singular forms "a," "an" and "the" include plural referents unless the context clearly dictates otherwise. Thus, for example, reference to "an image-enhancing agent" in a composition means that more than one image-enhancing agent can be present in the composition, reference to "a polyacid" includes mixtures of polyacids, reference to "a polybase" includes mixtures of polybases, and the like.

"Aqueous based ink" refers to ink composed of an aqueous carrier medium and a colorant, such as dye or pigment dispersions. An aqueous carrier medium is composed of water or a mixture of water and one or more water-soluble organic solvents. Exemplary aqueous based ink compositions are described in detail below.

"Colorant" as used herein is meant to encompass dyes, pigments, stains, and the like compatible for use with the opaque coating compositions of the invention.

The term "coating," as used herein to refer to the application of an opaque coating composition of the invention to a substrate, is intended to include application of a coating to a substrate surface with the composition.

The term "organic solvent" is used herein in its conventional sense to refer to a liquid organic compound, typically a monomeric organic material in the form of a liquid, preferably a relatively non-viscous liquid, the molecular structure of which contains hydrogen atoms, carbon atoms, and optionally other atoms as well, and which is capable of dissolving solids, gases or liquids.

The term "fluid resistance" is used herein to describe the resistance of a printed substrate to penetration by a fluid, with the term "water resistance" specifically referring to resistance of a substrate to penetration by water.

The term "luminescence", as used herein, is meant light emitted by radiative dissipation from an electronically excited state of a molecule. The term "fluorescence" is used to signify luminescence between states of identical multiplicity, typically between the lowest excited singlet state and the singlet ground state of the molecule. The term "phosphorescence" is used to signify luminescence between states of differing multiplicity, typically between the lowest excited triplet state and the singlet ground state.

The term "transparent" is used herein to signify a material capable of transmitting light so that objects or images can be seen as if there were no intervening material.

"Textile" or "textile substrate" as used herein refers to any cellulose-based or non-cellulose based textile material suitable for use as a printing substrate in connection with the coatings and/or methods of the invention. In general, where appropriate, the textile substrate has been sized, internally and/or externally, prior to application of the compositions of the invention.

The terms "treated textile substrate," "coated textile substrate," "treated textile substrate," and "coated textile substrate" are generally used herein to refer to a textile substrate that is treated with, i.e., has applied to its surface and/or is partially or wholly saturated with, the opaque coating of the present invention. The opaque coating composition is applied to the substrate in a separate coating operation prior to image formation, typically in amounts ranging from fifty (50) to five hundred (500) pounds per ton of substrate.

The term "recording liquid" is used herein to signify any ink, aqueous or solvent based, ink-gel, gel, or solution that is capable of rendering the opaque coating composition transparent or of increasing the amount of light capable of being emitted through the opaque coating composition.

The term "opaque" is used herein to signify a material that is not transparent or is only slightly translucent, so that images either cannot be seen through it at all or cannot be seen as if there were no intervening material. The opaque coating may or may not contain a color component.

The term "alkyl" as used herein refers to a branched or unbranched saturated hydrocarbon group of 1 to 24 carbon atoms, such as methyl, ethyl, n-propyl, isopropyl, n-butyl, isobutyl, t-butyl, octyl, decyl, tetradecyl, hexadecyl, eicosyl, tetracosyl and the like, as well as cycloalkyl groups such as cyclopentyl, cyclohexyl and the like. The term "lower alkyl" intends an alkyl group of 1 to 6 carbon atoms, preferably 1 to 4 carbon atoms.

The term "alkylene" as used herein refers to a difunctional, branched or unbranched saturated hydrocarbon group of 1 to 24 carbon atoms, including without limitation methylene, ethylene, ethane-1,1-diyl, propane-2,2-diyl, propane-1,3-diyl, butane-1,3-diyl, and the like. "Lower alkylene" refers to an alkylene group of 1 to 6 carbon atoms.

The term "alkenyl" as used herein refers to a branched or unbranched hydrocarbon group of 2 to 24 carbon atoms containing at least one carbon-carbon double bond, such as ethenyl, n-propenyl, isopropenyl, n-butenyl, isobutenyl, t-butenyl, octenyl, decenyl, tetradecenyl, hexadecenyl, eicosenyl, tetracosenyl and the like. Preferred alkenyl groups herein contain 2 to 12 carbon atoms and 2 to 3 carbon-carbon double bonds. The term "lower alkenyl" intends an alkenyl group of 2 to 6 carbon atoms, preferably 2 to 4 carbon atoms, containing one $-C{=}C-$ bond. The term "cycloalkenyl" intends a cyclic alkenyl group of 3 to 8, preferably 5 or 6, carbon atoms.

The term "alkenylene" refers to a difunctional branched or unbranched hydrocarbon chain containing from 2 to 24 carbon atoms and at least one carbon-carbon double bond. "Lower alkenylene" refers to an alkenylene group of 2 to 6, more preferably 2 to 5, carbon atoms, containing one $-C{=}C-$ bond.

The term "alkoxy" as used herein intends an alkyl group bound through a single, terminal ether linkage; that is, an "alkoxy" group may be defined as $-OR$ where R is alkyl as defined above. A "lower alkoxy" group intends an alkoxy group containing 1 to 6 carbon atoms.

The term "aryl" as used herein refers to an aromatic species containing 1 to 3 aromatic rings, either fused or linked, and either unsubstituted or substituted with 1 or more substituents typically selected from the group consisting of lower alkyl, halogen, $—NH_2$ and $—NO_2$. Preferred aryl substituents contain 1 aromatic ring or 2 fused or linked aromatic rings.

"Halo" or "halogen" refers to fluoro, chloro, bromo or iodo, and usually relates to halo substitution for a hydrogen atom in an organic compound.

The prefix "poly-" as in "polyacid" or "polybase" is intended to mean that the compound so designated has two or more acidic groups or two or more basic groups, respectively. Thus, the term "polyacid" herein encompasses a diacid, and the term "polybase" herein encompasses a dibase.

The term "polymer" is used herein in its conventional sense to refer to a compound having two or more monomer units, and is intended to include homopolymers as well as copolymers. The term "monomer" is used herein to refer to compounds that are not polymeric.

"Optional" or "optionally" means that the subsequently described event or circumstance may or may not occur, and that the description includes instances where said event or circumstance occurs and instances where it does not. For example, the phrase "optionally substituted" aromatic ring means that the aromatic ring may or may not be substituted and that the description includes both an unsubstituted aromatic ring and an aromatic ring bearing one or more substituents.

The present invention is based upon the discovery that an opaque coating composition comprising a mixture of a polyacid and a polybase is effective in masking the original surface of a glossy, reflective or luminescent substrate when coated or printed thereon, but upon contact with a solution or ink, e.g., upon printing, becomes more transparent, thereby increasing the amount of light reflected or emitted from the substrate's surface, revealing the glossy, reflective or luminescent substrate through the contacted area. Any conventional printing method may be used to form the image, e.g., printing, such as, ink-jet printing, including drop-on-demand and continuous printing, off-set printing, gravure printing, flexographic printing; brush stenciling; spray painting, etc. All that is required is that a recording liquid be contacted with the opaque coating composition to form the image. The method is even adaptable to non-mechanical imaging methods, e.g., drawing, handwriting and painting with aqueous inks, markers, or pens.

The coated substrates react rapidly with a number of colorants. Because colorants react quickly with the opaque coating, the recording liquid contacted, treated substrates are fast drying and do not require a separate curing step. This fast-drying characteristic provides for images that are "non-sticky," thus allowing the printed substrate to be handled immediately after formation. Processes for producing light-emitting, reflective or metallic-looking images using opaque coating compositions, the opaque coating compositions themselves, substrates coated with the opaque coatings, described herein, and other features of the invention are described in greater detail below.

II. Process for Producing Metallic-Looking Images on Coated Substrates

In one aspect, then, the invention features a method for producing a light-emitting, glossy, reflective or metallic-looking image on a substrate surface by first applying to a glossy, reflective or luminescent substrate surface an opaque coating composition comprising a mixture of a polyacid and a polybase and then contacting the treated substrate with a recording liquid, e.g., applying an ink or solution. In a preferred embodiment, the recording liquid comprised an ink that contains a colorant having ionizable, nucleophilic or otherwise reactive groups capable of reacting with the opaque coating agent in the opaque coating composition. Non-ionizable colorants such as dispersed pigment type ink are also suitable.

A. The Substrate:

A wide variety of substrates can be used, provided that the substrate surface is light-emitting reflective, glossy, or luminescent. The substrate may be comprised of a material that inherently provides a light-emitting, reflective, glossy, or luminescent surface, or a substrate that does not have these characteristics may be used so long as it is coated or treated with a light-emitting, reflective, glossy, or luminescent material to provide the desired surface. The substrates may be flexible or rigid, porous or nonporous, and cellulosic or non-cellulosic. The reflective surface of the substrate may be, for example, holographic or metallic.

Suitable substrates with which the present compositions and methods can be used include, but are not limited to, paper, polymeric substrates, textiles, inorganic substrates, metallic sheets, laminates, foil laminated polymer sheets, metallized polymer sheets, and the like. Examples of specific substrates that may be used include, for example: polymeric films, sheets, coatings, and solid blocks, comprised of, for example, polyesters (including "MYLAR®" flexible film), vinyl polymers, polysulfones, polyurethanes, polyacrylates, polyimides, or the like; metallic films, sheets, coatings, foils and solid blocks, comprised of, for example, aluminum, brass, copper, or the like; inorganic substrates in the form of films, sheets, coatings, objects, and solid blocks, comprised, of, for example, glass, metal oxides, silicon-containing ceramics, and the like; textiles having a reflective or luminescent surface; and laminates such as a paper/polymeric film, polymeric film/metal foil laminate, or paper/metal foil laminate. The nature of the substrate is not, however, critical; it must be emphasized that any substrate having a light emitting, reflective, glossy, or luminescent surface can be used in conjunction with the invention to produce a glossy, reflective, light emitting, or metallic-looking image when contacted with a recording liquid.

When the substrate is not itself, light-emitting, reflective, glossy, or luminescent, it must be treated to provide a light-emitting, reflective, glossy, or luminescent surface. For example, a layer of a metallic foil or reflective polymeric film can be laminated to the substrate, or the substrate surface may be coated or treated with reflective or luminescent materials, e.g., luminescent dyes from the fluorescein, rhodamine, pyrene and porphyrin families. After such a treatment, the light-emitting, reflective, or luminescent surface may be coated with a transparent coating that does not interfere with the opaque coating composition.

In one embodiment, the substrate is comprised of a paper/foil laminate or a polymer film that has been metallized by sputtering or other processes. The paper layer may be formed from any convenient type of printing paper stock of desired weight. The paper substrate is preferably in the form of a flat or sheet structure of variable dimensions. "Paper" is meant to encompass printing paper (e.g., inkjet printing or conventional printing paper such as gravure, litho, etc.), writing paper, drawing paper, and the like, as well as board materials such as cardboard, poster board, Bristol board, and the like. Numerous paper compositions are well known and various types of additives which can be incorporated into paper for different purposes are also well known and widely described; see for instance, Blair (ed.), The Lithographers Manual, (7th Edn.: 1983), Chapter 13, Sections 8 and 9.

To prepare a paper/metal foil laminate, a reflective layer is applied to the paper portion of the substrate by using a suitable coating method such as spraying, to deposit a metal-containing coating onto the paper surface, or by adhering a metallicized sheet such as thin metal foil to the paper surface. While the foil or coating may be applied only in selected areas, it is preferred in most cases to have the entire surface of the paper covered with the reflective layer. Papers with preapplied foil coverings forming paper foils are also available commercially and may be used herein. These commercial paper/foil laminates are available in a range of thicknesses and weights, such that foil papers with any desired degree of flexibility or stiffness can be selected. Those skilled in the art will be readily able to select the appropriate type of paper, foil or paper/foil laminate for use with the desired type and weight of final product to be produced.

In another embodiment, the substrate is a reflective or glossy textile or a textile that has been treated with a luminescent material. In general, the opaque coating compositions and printing methods of the invention can be used with any textile substrate amenable to use with such coating compositions and methods so long as the textile has a light-emitting, reflective or luminescent surface. Suitable textile substrates for use with the present invention include textiles having natural, synthetic, cellulose-based, or non-cellulose-based fibers or any combination thereof. Exemplary textile substrates include, but are not limited to, textiles having hydroxy group-containing fibers such as natural or regenerated cellulosic fibers (cotton, rayon, and the like); nitrogen group-containing fibers such as polyacrylonitrile; natural or synthetic polyamides (including wool, silk, or nylon); and/or fibers having acid-modified polyester and polyamide groups. The substrates may be additionally pre-treated or after-treated with resins or other substances compatible with the coating compositions and methods of the invention, and may be finished or unfinished. The textile substrate may also be sized prior to application of the opaque coating composition. Alternatively, the present coating compositions may be incorporated into an external sizing process, so that sizing and coating is conducted in a single step.

The fibers of the textile substrate may be in any suitable form compatible with the selected image forming process. e.g., loose yams, or fabrics. Fabrics are a convenient and preferred form. The fibers may be blended with other fibers that are susceptible to treatment with the opaque coating composition of the invention, or with fibers that may prove less susceptible to such treatment B. The Opaque Coating Composition:

The opaque coating composition is then applied to the light-emitting, reflective, glossy, or luminescent surface. The opaque coating composition may be applied in any conventional manner, e.g., using a Meyer rod, slot die, roller, knife, dipping, painting, spraying, etc. Generally, coating is accomplished by dip coating, reverse roll coating, extrusion coating, or the like. If the substrate is a paper or thin polymeric film and the coating composition is applied on-machine, in order to achieve acceptable manufacture speeds of about 100 to 2000 feet per minute, preferably 100-1000 feet per minute, it is recommended that the weight of the substrate, e.g., sized paper, be greater than about 30 grams per square meter.

The opaque coating compositions are composed of an opaque coating agent that comprises a mixture of a polyacid and a polybase. In addition to the opaque coating agent, the coating composition can include components such as film-forming binders, pigments, and other additives.

The opaque coating compositions can be readily prepared from commercially available starting materials and/or reagents, are compatible with additional binders or additives, can be used with a variety of substrates, are compatible with a variety of printing methods, including conventional and digital printing methods particularly ink-jet printing, including drop-on-demand printing and continuous printing), and can also be used with existing commercial manufacturing methods and equipment, including, for example, paper production processes and equipment. The opaque coating composition is inexpensive to prepare, and relatively small amounts are required to provide a coated substrate suitable herein. The opaque coating compositions are also easy to handle due to their solubility in water, and do not require the use of large volumes of organic solvents.

The opaque coating agent typically represents approximately 5% to 95%, preferably about 10% to 95%, of the opaque coating composition, based upon total solids weight of the composition after drying.

The polyacid and polybase, which together represent the "opaque coating agent," may be either monomeric or polymeric. That is, the opaque coating agent may be composed of any suitable combination of: 1) a monomeric polyacid and a monomeric polybase; 2) a polymeric polyacid and a polymeric polybase; 3) a polymeric polyacid and a monomeric polybase; and/or 4) a monomeric polyacid and a polymeric polybase. The opaque coating agent may also be comprised of more than one different type of polyacid or polybase and compositions comprised of, for example, a monomeric polyacid, a monomeric polybase, and a polymeric polybase or a monomeric poly acid, a polymeric polyacid, and a monomeric and/or polymeric polybase and the like are also possible. The selection of these combinations for use as the opaque coating agent in the present compositions will vary according to a variety of factors such as the nature of the substrate to be treated, the colorant to be used in printing on the treated substrate, etc. The relative ratios of the polyacid and polybase within the mixture will also vary according to such factors, but typically the ratio of base to acid is in the range of approximately 0.5:1 to 10:1, more typically in the range of approximately 1:1 to 3:1.

In general, the pH of the coating composition having a polyacid/polybase opaque coating agent is generally in the range of about 6-12, preferably at least about 7.5-10. The pH is maintained by the addition of appropriate bases such ammonia, primary, secondary, and tertiary alkyl amines, ethanolamines, diamine, and the like.

In general, monomeric polyacids will contain two or more carboxylic, sulfonic and/or phosphonic acid groups. Exemplary monomeric polyacids have the structural formula (I)

$$[R\text{—}(L_x\text{—}COOH)_y]_z \qquad (I)$$

wherein: R is selected from the group consisting of alkyl, alkenyl, aryl of 1 to 3 rings which may be fused or linked, and 5- and 6-membered heterocyclic rings having from 1 to 3 heteroatoms selected from N, S and O; L is an alkylene or alkenylene chain containing 1 to 8 carbon atoms; x is 0 or 1; y is an integer in the range of 2 to 10 inclusive; and z is 1, 2 or 3, with the provisos that (a) if w is 0 and x is 0, then y is 2 and z is 2, and (b) if z is 2 or 3, the distinct R groups are covalently linked to each other.

Specific examples of preferred monomeric polyacids include, but are not necessarily limited to, oxalic acid, maleic acid, succinic acid, methylsuccinic acid, malonic acid, adipic acid, glutaric acid, fumaric acid, dihydroxyfumaric acid, malic acid, mesaconic acid, itaconic acid, phthalic acid, isophthalic acid, terephthalic acid, 1,2-, 1,3- and 1,4-cyclohexane dicarboxylic acids, 1,2,3-cyclohexane tricarboxylic acid, 1,2,4-cyclohexane tricarboxylic acid, 1,3,5-cyclohexane tricarboxylic acid, 1,2- and 1,3-cyclopentane dicarboxylic acids, citric acid, tartaric acid, dihydroxyterephthalic acid, 1,2,3-, 1,2,4- and 1,2,5-benzene tricarboxylic acids, tricarballylic acid, 1,2,4,5-benzene tetracarboxylic acid, norbornene tetracarboxylic acid, 3,3',4,4'-benzophenone tetracarboxylic acid, 1,2,3,4,5,6-benzene hexacarboxylic acid, aspartic acid, glutamic acid, and combinations thereof.

In general, monomeric polybases useful herein contain two or more primary, secondary or tertiary amino groups. Exemplary monomeric polybases have the structural formula (II)

$$[R—(L_x—NR^1R^2)_y]_z \quad \text{(II)}$$

wherein $R^1$ and $R^2$ are hydrogen, alkyl, alkoxy, or hydroxyl-substituted alkoxy, and R, L, x, y and z are as defined with respect to the monomeric polyacid.

Specific examples of monomeric polybases include, but are not limited to, ethylenediamine, 1,2-propane diamine, 1,3-propanediamine, 1,2,3-triaminopropane, cis-1,2-cyclohexanediamine, trans-1,2-cyclohexanediamine, 1,3-bis(aminomethyl)cyclohexane, o-, m- and p-phenylenediamine, tetramethyl o-, m- and p-phenylenediamine, hexamethylenediamine, hexamethylenetetraamine, diethylenetriamine, tetraethylenepentamine, pentaethylenehexamine, pentamethyl diethylenetriamine, tris(2-aminoethyl) amine, 1,1,4,7,10,10-hexamethyl triethylenetetramine, tetramethyl-p-phenylenediamine, tetramethylethylenediamine, triethylenetetraamine, 4,4'-bipyridyl, and combinations thereof.

The polymeric polyacids contain carboxylic, sulfonic and/or phosphonic acid groups, but most preferably contain carboxylic acid groups. Examples of polymeric polyacids include, without limitation, poly(acrylic acid), poly(acrylonitrile-acrylic acid), poly(styrene-acrylic acid), poly(butadiene-acrylonitrile acrylic acid), poly(butylacrylate-acrylic acid), poly(ethyl acrylate-acrylic acid), poly(methacrylate-acrylic acid), poly(methyl methacrylate-acrylic acid), poly (methyl methacrylate-styrene-acrylic acid), poly(vinyl pyrrolidone-acrylic acid), poly(styrene-co-maleic acid), poly (methyl methacrylate-styrene-co-maleic), poly(ethylene-propylene-acrylic acid), poly(propylene-acrylic acid), alginic acid, phytic acid, and combinations thereof.

The polymeric polybases comprise nitrogenous polymers that may have pendant primary, secondary or tertiary amine groups and/or nitrogenous moieties in the backbone, i.e., —NH— or —NX— groups, where X is typically alkyl of 2 to 8 carbon atoms, lower acyl, or $—(CH_2)_nR^3$ wherein m is an integer in the range of 1 to 10 and $R^3$ is hydroxyl or $—OR^4$ wherein $R^4$ is $C_1$-$C_4$ alkyl. For example, the basic polymer may be a copolymer containing first monomer units having the structure $—CH_2—CH_2—NH—$, second monomer units having the structure $—CH_2—CH_2—NX—$ wherein X is as defined above, and optionally third monomer units having the structure $—CH_2—CH(COOH)—$. Exemplary polymeric polybases include, but are not limited to, polyethyleneimine, polyvinylpyridine, polyallylamine (including N-alkylated and N,N-dialkylated polyallylamines), polyvinylaziridine, polyimidazole, polylysine, chitosan, poly(amino and alkylated amino)ethylenes, ethoxylated polyethyleneimine, propoxylated polyethyleneimine, polyvinylpyrrolidone, dimethylaminoacrylate, polyvinylpyrrolidone diethylaminoacrylate, vinyl pyrrolidonedimethylaminopropyl methacrylamide copolymer and combinations thereof.

The opaque coating composition preferably includes a film-forming binder, i.e., a substance that provides for improved strength of a substrate upon application thereto. "Film-forming binders" used in connection with the compositions of the invention include any film-forming binders that are compatible with the selected opaque coating agent and other components of the coating composition. Exemplary film-forming binders include, but are not necessarily limited to: polysaccharides and derivatives thereof, e.g., starches, cellulosic polymers, dextran and the like; polypeptides (e.g., collagen and gelatin); and synthetic polymers, particularly synthetic vinyl polymers such as poly(vinyl alcohol), poly(vinyl phosphate), poly(vinyl pyrrolidone), vinyl-pyrrolidone-vinyl acetate copolymers, vinyl acetate-acrylic acid copolymers, vinyl alcohol-vinyl acetate copolymers, vinyl pyrrolidone-styrene copolymers, and poly(vinyl amine), synthetic acrylate polymers and copolymers such as poly(acrylic acid-co-methacrylate), poly(vinyl-co-acrylate), poly(vinylpyrrolidone-co-dimethylaminopropyl-methacrylamide), and the like, and water-soluble or water-dispersible polyesters such as sulfopolyesters (e.g., as available from Eastek).

Polysaccharide binders: Starches, as noted above, represent one category of suitable film-forming binders for use herein. Suitable starches may be any of a variety of natural, converted, and synthetically modified starches. Exemplary starches include, but are not necessarily limited to, starch (e.g., SLS-280 (St. Lawrence Starch)), cationic starches (e.g., Cato-72 (National Starch), hydroxyalkylstarch, wherein the alkyl has at least one carbon atom and wherein the number of carbon atoms is such that the material is water soluble, preferably from about 1 to about 10 carbon atoms, such as methyl, ethyl, propyl, butyl, or the like (e.g., hydroxypropyl starch #02382 (PolySciences, Inc.), hydroxyethyl starch #06733 (PolySciences, Inc.), Penford Gum 270 and 280 (Penford), and Film-Kote (National Starch)), starch blends (see, e.g., U.S. Pat. No. 4,872,951, describing a blend of cationic starch and starch treated with an alkyl or alkenyl succinic anhydride (ASA), preferably 1-octenyl succinic anhydride (OSA)), and the like. The film-forming binder can also be a synthetically produced polysaccharide, such as a cationic polysaccharide esterified by a dicarboxylic acid anhydride (see, e.g., U.S. Pat. No. 5,647,898). Additional saccharide binders include cellulosic materials such as alkyl celluloses, aryl celluloses, hydroxy alkyl celluloses, alkyl hydroxy alkyl celluloses, hydroxy alkyl celluloses, dihydroxyalkyl cellulose, dihydroxyalkyl cellulose, hydroxy alkyl hydroxy alkyl cellulose, halodeoxycellulose, amino deoxycellulose, dialkylammonium halide hydroxy alkyl cellulose, hydroxyalkyl trialkyl ammonium halide hydroxyalkyl cellulose, dialkyl amino alkyl cellulose, carboxy alkyl cellulose salts, cellulose sulfate salts, carboxyalkylhydroxyalkyl cellulose and the like). Still additional film-forming binders of this type include dextran (e.g., dialkyl aminoalkyl dextran, amino dextran, and the like), carrageenan, Karaya gum, xanthan, guar and guar derivatives, (e.g., carboxyalkyl hydroxyalkyl guar, cationic guar, and the like), and gelatin.

Additional exemplary film-forming binders include resins (e.g., such as formaldehyde resins such as melamine-formaldehyde resin, urea-formaldehyde resin, alkylated urea-formaldehyde resin, and the like), ionic polymers (e.g., poly(2-acrylamide-2-methyl propane sulfonic acid, poly(N, N-dimethyl-3,5-dimethylene piperidinium chloride, poly (methylene-guanidine), and the like), maleic anhydride and maleic acid-containing polymers (e.g., styrene-maleic anhydride copolymers, vinyl alkyl ether-maleic anhydride copolymers, alkylene-maleic anhydride copolymers, butadiene-maleic acid copolymers, vinylalkylether-maleic acid copolymers, alkyl vinyl ether-maleic acid esters, and the like), acrylamide-containing polymers (e.g., poly(acrylamide), acrylamide-acrylic acid copolymers, poly(N,N-dimethyl acrylamide), and the like), poly(alkylene imine)-containing polymers (e.g., poly(ethylene imine), poly(ethylene imine) epichlorohydrin, alkoxylated poly(ethylene imine), and the like), polyoxyalkylene polymers (e.g., poly(oxymethylene), poly(oxyethylene), poly(ethylene oxide), ethylene oxide/propylene oxide copolymers, ethylene oxide/2-hydroxyethyl methacrylate/ethylene oxide and ethylene oxide/hydroxypropyl methacrylate/ethyleneoxide triblock copolymers, ethylene oxide-4-vinyl pyridine/ethylene oxide triblock copolymers, ethylene oxide-isoprene/ethylene oxide triblock copolymers, epichlorohydrin-ethylene oxide copolymer, and the like), etc.

Any of the above exemplary film-forming binders can be used in any effective relative amounts, although typically the film-forming binder, if present, represents approximately 1 wt. % to 50 wt. %, preferably 1 wt. % to 25 wt. %, most preferably 1 wt. % to 15 wt. % of the opaque coating composition, after drying on a substrate. Starches and latexes are of particular interest because of their availability and applicability to a variety of substrates.

Additional components of the opaque coating composition may be present, and include, but are not necessarily limited to, inorganic fillers, anti-curl agents, surfactants, plasticizers, humectants, UV absorbers, optical brighteners, light fastness enhancers, polymeric dispersants, dye mordants and leveling agents, as are commonly known in the art. Preferred additives are optical brighteners, which generally represents approximately 0.0 wt. % to 2.0 wt. % of the coating composition after drying on a substrate. Illustrative examples of such additives are provided in U.S. Pat. Nos. 5,279,885 and 5,537,137. The opaque coating compositions may also include a crosslinking agent such as zirconium acetate, ammonium zirconium carbonate, or the like, for intramolecular and/or intermolecular crosslinking of the opaque coating agent, and/or a chelating agent such as boric acid. Colorants e.g., pigments, dyes, or other colorants, may also be present in the opaque coating composition.

While the opaque coating composition can be prepared in an organic solvent, it is preferably provided in an aqueous liquid vehicle wherein small amounts of a water-soluble organic solvent may be present. The aqueous liquid vehicle will generally be water, although other inorganic compounds which are either water-soluble or water miscible may be included as well. It may on occasion be necessary to add a solubilizing compound during preparation of the coating composition so that the components dissolve in the aqueous liquid vehicle, e.g., an inorganic base such as ammonia and/or an organic amine. Suitable organic amines include lower alkyl-substituted amines such as methylamine, dimethylamine, ethylamine, and trimethylamine, as well as ethanolamine, diethanolamine, triethanolamine, and substituted ethanolamines, typically lower alkyl-substituted ethanolamines such as N-methyl and N,N-dimethyl ethanolamines, and morpholine. Such compounds are also useful for bringing the pH into the desired range for basic formulations as discussed in the preceding section, and, if present, will generally represent not more than about 20 wt. % of the composition, and in most cases will represent not more than about 10 wt. % of the composition.

C. Image Formation:

Once an opaquely coated, reflective, glossy, or luminescent substrate is produced, the opaquely coated substrate is contacted with an ink or other solution to render the coating transparent; in a preferred embodiment, an image forming step using an aqueous or solvent based ink is employed to impart desired colors and form a light-emitting, reflective, glossy, or metallic-looking image. The image forming step may employ any of a variety of printing techniques, including inkjet printing, laserjet printing, flexographic printing, gravure printing and the like, or may employ the use of a writing instrument such as a pen, marker, gel pen, rollerball pen, ballpoint pen, and the like. In general, the image forming process involves applying, in an imagewise pattern, a recording liquid to a coated substrate of the invention. Inkjet printing processes suitable for the method of the invention are well known in the art; see, for example, U.S. Pat. Nos. 4,601,777; 4,251,824; 4,410,899; 4,412,224; and 4,532,530. Thermal ink transfer printers that use dye sublimation process can also form the light-emitting, reflective or metallic-looking images. Hot melt type inkjet printers, such as Tektronix inkjet printers that use inks formed of low melting solids are also suitable. The light-emitting, reflective or metallic-looking images can also be produced using a variety of other printing and imaging processes, such as offset printing, printing with pen plotters, drawing, handwriting, painting with ink pens, brush stenciling, spray painting, and the like.

In general, inks are used in the formation of the image on the treated substrates of the invention. The ink may be any suitable ink containing a colorant, e.g., a pigment, dye, or stain, having one or more reactive groups suitable for reacting, either covalently or ionically, with a colorant-reactive component of the opaque coating agent present on the treated substrate. Aqueous and solvent-based, dye sublimation, or hot melt inks are all acceptable. The selection of the specific ink and colorant will vary with the colorant-reactive component of the image-enhancing agent. Thus, preferred colorants for use in forming an image on a substrate treated with the present image-enhancing compositions are those containing one or more ionizable, nucleophilic or otherwise reactive moieties. Particularly preferred colorants contained in the inks useful with the invention are thus dyes containing acidic groups (e.g., carboxylate, phosphonate, sulfonate or thiosulfonate moieties), basic groups (e.g., unsubstituted amines or amines substituted with 1 or 2 alkyl, typically lower alkyl, groups), and/or nucleophilic or otherwise reactive moieties (e.g., hydroxyl, sulfhydryl, cyano or halo).

The selection of the ink will depend upon the requirements of the specific application, such as desired surface tension, viscosity, drying time, and the like. If aqueous ink is selected, the aqueous liquid vehicle of inks suitable for use in the invention will generally be water, although other nonorganic compounds which are either water-soluble or water miscible may be included as well. The colorant may be dissolved, dispersed or suspended in the aqueous liquid vehicle, and is present in an amount effective to provide the dried ink with the desired color and color intensity.

In some instances, the dye is contained in a carrier medium composed of ink and a water-soluble organic solvent. For applications utilizing such a carrier medium, representative solvents include polyols such as polyethylene alcohol, diethylene glycol, propylene glycol, and the like. Additional solvents are simple alcohols such as ethanol, isopropanol and benzyl alcohol, and glycol ethers, e.g., ethylene glycol monomethyl ether, diethylene glycol monoethyl ether. Representative examples of water-soluble organic solvents are described in U.S. Pat. No. 5,085,698 and U.S. Pat. No. 5,441,561. Suitable water soluble organic solvents include, but are not limited to, $C_{1-5}$-alkanols, e.g. methanol, ethanol, n-propanol, isopropanol, n-butanol, sec-butanol, tert-butanol and isobutanol; amides, e.g., dimethylformamide and dimethylacetamide; ketones and ketone alcohols, e.g., acetone and diacetone alcohol; $C_{2-4}$-ethers, e.g. tetrahydrofuran and dioxane; alkylene glycols or thioglycols containing a $C_2$-$C_6$ alkylene group, e.g., ethylene glycol, propylene glycol, butylene glycol, pentylene glycol and hexylene glycol; poly(alkylene-glycol)s and poly(alkylene-thioglycol)s, e.g., diethylene glycol, thiodiglycol, polyethylene glycol and polypropylene glycol; polyols, e.g., glycerol and 1,2,6-hexanetriol; lower alkyl glycol and polyglycol ethers, e.g., 2-methoxyethanol, 2-(2-methoxyethoxy)ethanol, 2-(2-ethoxyethoxy)-thanol, 2-(2-butoxyethoxy)ethanol, 3-butoxypropan-1-ol, -[2-(2-methoxyethoxy)-ethoxy]ethanol, 2-[2-(2-ethoxyethoxy)ethoxy]-ethanol; cyclic esters and cyclic amides, e.g., optionally substituted pyrollidones; sulpholane; and mixtures containing two or more of the aforementioned water soluble organic solvents. Water insoluble organic solvents may also be used. Suitable water insoluble organic solvents include, but are not limited to, aromatic hydrocarbons, e.g., toluene, xylene, naphthalene, tetrahydronaphthalene and methyl naphthalene; chlorinated aromatic hydrocarbons, e.g., chlorobenzene, fluorobenzene, chloronaphthalene and bromonaphthalene; esters, e.g., butyl acetate, ethyl acetate, methyl benzoate, ethyl benzoate, benzyl benzoate, butyl benzoate, phenylethyl acetate, butyl lactate, benzyl lactate, diethyleneglycol dipropionate, dimethyl phthalate, diethyl phthalate, dibutyl phthalate, di(2-ethylhexyl)phthalate; alcohols having six or more carbon atoms, e.g. hexanol, octanol, benzyl alcohol, phenyl ethanol, phenoxy ethanol, phenoxy propanol and phenoxy butanol; ethers having at least 5 carbon atoms, preferably $C_{5-14}$ ethers, e.g. anisole and phenetole; nitrocellulose, cellulose ether, cellulose acetate; low odour petroleum distillates; turpentine; white spirits; naphtha; isopropylbiphenyl; terpene; vegetable oil; mineral oil; essential oil; and natural oil; and mixtures of any two or more thereof.

Specific examples of suitable colorants include, but are not limited to, the following: Dispersol Blue Grains (Zeneca, Inc.), Duasyn Acid Blue (Hoechst Celanese), Duasyn Direct Turquoise Blue (Hoechst Celanese), Phthalocyanine blue (C.I. 74160), Diane blue (C.I. 21180), Pro-jet Cyan 1 (Zeneca, Inc.), Pro-jet Fast Cyan 2 (Zeneca, Inc.), Milori blue (an inorganic pigment equivalent to ultramarine) as cyan colorants; Dispersol Red D-B Grains (Zeneca, Inc.), Brilliant carmine 6B (C.I. 15850), Pro-jet magenta 1 (Zeneca, Inc.), Pro-jet Fast magenta 2 (Zeneca, Inc.), Brilliant Red F3B-SF (Hoechst Celanese), Red 3B-SF (Hoechst Celanese), Acid Rhodamine (Hoechst Celanese), Quinacridone magenta (C.I. Pigment Red 122) and Thioindigo magenta (C.I. 73310) as magenta colorants; Dispersol Yellow D-7G 200 Grains (Zeneca, Inc.), Brilliant yellow (Hoechst Celanese), Pro-jet yellow 1 (Zeneca, Inc.), Pro-jet Fast Yellow 2 (Zeneca, Inc.), benzidine yellow (C.I. 21090 and C.I. 21100) and Hansa Yellow (C.I. 11680 ) as yellow colorants; organic dyes; and black materials such as carbon black, charcoal and other forms of finely divided carbon, iron oxide, zinc oxide, titanium dioxide, and the like. Specific and preferred black colorants include Acid Black 48 (Aldrich), Direct Black 58756 A (Crompton & Knowles), BPI Molecular Catalytic Gray (Brain Power), Fasday Cool Gray (Hunter Delator), Dispersol Navy XF Grains (Zeneca, Inc.), Dispersol Black CR—N Grains (Zeneca, Inc.), Dispersol Black XF Grains (Zeneca, Inc.), Disperse Black (BASF), Color Black FW18 (Degussa), Color Black FW200 (Degussa), Hostafine Black TS (Hoechst Celanese), Hostafine Black T (Hoechst Celanese), Duasyn Direct Black (Hoechst Celanese), Pro-jet Black 1 (Zeneca, Inc.) and Pro-jet Fast Black 2 (Zeneca, Inc.). Other suitable colorants are disclosed in U.S. Pat. Nos. 4,761,180, 4,836,851, 4,994,110 and 5,098,474.

In an additional aspect of the invention the light-emitting, reflective or metallic-looking image is produced by having the image or color scheme printed on the reflective or luminescent layer prior to the coating with the opaque coating composition. The light-emitting, reflective or metallic-looking image is generated by contacting the coated substrate with an aqueous solution that may optionally contain a dye or colorant, as discussed above. Embodiments of this type have utility as art or craft materials. The coated substrates of the invention may be used as "magic" papers and the like for children, wherein a hidden image appears on contact with a solution.

All patents, patent applications, journal articles and other references mentioned herein are incorporated by reference in their entireties.

Experimental

The following examples are put forth so as to provide those of ordinary skill in the art with a complete disclosure and description of how to prepare and use the compounds disclosed and claimed herein. Efforts have been made to ensure accuracy with respect to numbers (e.g., amounts, temperature, etc.) but some errors and deviations should be accounted for. Unless indicated otherwise, parts are parts by weight, temperature is in ° C. and pressure is at or near atmospheric.

Also, in these examples, unless otherwise stated, the abbreviations and terms employed have their generally accepted meanings. Abbreviations and tradenames are as follows (note that suppliers of each material are indicated as well):

Joncryl 62=Joncryl 62®, arcrylic polymer (SC Johnson);

Epomine 1050=Epomine 1050, polyethylene imine (Nippon Shokubai, Co Ltd.);

ISP 937=ISP 937®, polyvinylpyrrolidone-dimethylaminomethacrylate (ISP);

PVA 523S=PVA 523S®, polyvinyl alcohol, binder (Airvol 523S®, Air Product);

Acusol 445=Acusol 445, acrylate copolymer (Rohm & Haas Co.)

Alcosperse 409=Alcosperse 409®, polyacrylic acid (Alco Chemical);

Surfynol SE-F=Surfynol SE-F®, surfacant (Air Product);

Lupasol SKA=Lupasol SKA®, ethoxylated polyethylenimine (BASF);

Rhophex AR-74=Rhophex AR-74®, acrylic polymer (Rohm & Haas Co.);

Silica=Aerosil MOX 170®, fumed silica (Degussa).

EXAMPLE 1

Procedure for Metallic Printing

The following components were blended for 20 minutes in a high shear mixer, producing a thick solution.

| | |
|---|---|
| Joncryl 62 | 25.0 g |
| ISP 937 | 10.0 g |
| Alcosperse 409 | 4.0 g |
| Lupasol SKA | 8.0 g |
| PVA 523S | 27.3 g |
| Surfynol SE-F | 1.0 g |
| Liquor Ammonia | 24.0 g |
| Water | 20.0 g |

Metal foil laminated sheets were then coated with the solution using No. 20, 30 and 40 Meyer rods. The coated sheets were allowed to dry and upon drying, the coating became white and opaque. A Hewlett Packard 850 inkjet printer was then used to print an image onto one of the coated sheets. After drying the printed sheet for 2 minutes at room temperature, a metal-looking image was obtained.

EXAMPLE 2

Metallic Printing Using a Two-Component System

The above given general procedure can also be used as two component system and components can be mixed prior to use. The following components were obtained by blended the listed constituents for 10 minutes at 4000 rpm in a high shear mixer. Each component was then labeled and stored in a separate vial.

| Component A | | Component B | |
|---|---|---|---|
| Joncryl 62 | 62.5 g | Lupasol SKA | 20.0 g |
| ISP 937 | 25.0 g | PVA 523S | 68.25 g |
| Alcosperse 409 | 10.0 g | Liquor Ammonia | 30.0 g |
| Surfynol SE-F | 2.5 g | | |
| Liquor Ammonia | 30.0 g | | |
| Water | 50.0 g | | |

10.0 g of Component A and 6.57 g of Component B were weighed, combined and manually shaken for one minute and then applied onto metallized sheet using No. 20, 30 and 40 Meyer rods. The coated sheets were allowed to dry and upon drying, the coating became white and opaque. A Hewlett Packard 850 inkjet printer was then used to print an image onto one of the coated sheets. After drying the printed sheet for 2 minutes at room temperature, a metal-looking image was obtained.

EXAMPLE 3

Procedure for Metallic Printing

The procedure of Example 1 was repeated using the following using a coating solution containing the following components:

| | |
|---|---|
| Joncryl 62 | 62.5 g |
| ISP 937 | 25.0 g |
| PVA 523S | 68.25 g |
| Acusol 445 | 10.0 g |
| Surfynol SE-F | 3.0 g |
| Lupasol SKA | 20.0 g |
| Liquor Ammonia | 25.0 g |
| Water | 100.0 g |

EXAMPLE 4

Procedure for Metallic Printing

The procedure of Example 1 was repeated using a coating solution containing the following components:

| | |
|---|---|
| Joncryl 62 | 29.55 g |
| ISP 937 | 10.0 g |
| PVA 523S | 13.65 g |
| Acusol 445 | 4.0 g |
| Surfynol SE-F | 1.2 g |
| Lupasol SKA | 8.0 g |
| Liquor Ammonia | 30.0 g |
| Water | 60.0 g |

EXAMPLE 5

Procedure for Metallic Printing

The procedure of Example 1 was repeated using a coating solution containing the following components:

| | |
|---|---|
| Joncryl 62 | 25.0 g |
| ISP 937 | 10.0 g |
| PVA 523S | 27.3 g |
| Alcosperce 409 | 4.0 g |
| Surfynol SE-F | 0.4 g |
| Lupasol SKA | 8.0 g |
| Liquor Ammonia | 30.0 g |
| Isopropyl Alcohol | 10.0 g |
| Water | 40.0 g |

EXAMPLE 6

Opaque Coating Compositions

Table 1 summarizes exemplary opaque coating compositions in accordance with the invention. Each of the representative formulations was prepared using the methods described in Example 1 and used to coat metallized sheets, which were then printed on using an aqueous ink and an inkjet printer. The resulting images so prepared were found to have the metallic-looking appearance described herein.

TABLE 1

Opaque Coating Formulations

| | Example Number | | | | | | | | | |
|---|---|---|---|---|---|---|---|---|---|---|
| Components/Sample | 6 | 7 | 8 | 9 | 10 | 11 | 12 | 13 | 14 | 15 |
| Joncryl 62 | 25.0 g | 25.0 g | 25.0 g | 25.0 g | 25.0 g | 25.0 g | 25.0 g | 25.0 g | 29.55 g | 62.5 g |
| Epomine 1050 | 1.5 g | 1.5 g | 1.5 g | 3.0 g | 2.25 g | 3.0 g | — | — | — | — |

TABLE 1-continued

Opaque Coating Formulations

| Components/Sample | Example Number 6 | 7 | 8 | 9 | 10 | 11 | 12 | 13 | 14 | 15 |
|---|---|---|---|---|---|---|---|---|---|---|
| ISP 937 | 10.0 g | 10.0 g | 10.0 g | 10.0 g | 10.0 g | 10.0 g | 10.0 g | 10.0 g | 10.0 g | 25.0 g |
| Polyvinyl alcohol 523S | 27.3 g | 27.3 g | 18.2 g | 27.3 g | 27.3 g | 27.3 g | 27.3 g | 27.3 g | 13.65 g | 68.25 g |
| Acusol 445 | — | — | — | — | — | — | — | 4.0 g | 4.0 g | 10.0 g |
| Polyacrylic Acid* | 4.0 g | 1.0 g | 1.0 g | 3.5 g | 2.5 g | 2.5 g | 3.5 g | — | — | — |
| Surfynol SE-F | 0.4 g | 0.4 g | 0.4 g | 0.4 g | 0.4 g | 0.4 g | 0.4 g | 0.4 g | 1.2 g | 3.0 g |
| Lupasol SKA | — | — | — | — | — | — | 7.0 g | 8.0 g | 8.0 g | 20.0 g |
| Rhoplex AR-74 | 1.8 g | — | — | — | — | — | — | — | — | — |
| Silca (aerosil) | — | 0.56 g | 0.56 g | — | — | — | — | — | — | — |
| Liquor Ammonia | 20.0 g | 20.0 g | 20.0 g | 20.0 g | 20.0 g | 20.0 g | 20.0 g | 30.0 g | 30.0 g | 25.0/ 75.0 g |
| Isopropyl alcohol | — | — | — | — | — | — | — | 10.0 g | — | — |
| Water | 20.0 g | 20.0 g | 20.0 g | 20.0 g | 20.0 g | 20.0 g | 18.0 g | 40.0 g | 60.0 g | 100.0 g |
| Printout Quality | Good | Good | Good | Good | Good | Good | Good | Good | Good | Good |
| Printout ID | 91 | 127 | 129 | 146 | 154 | 156 | 186 | 226 | 239 | 260 |

The invention claimed is:

1. A process for producing a dry image on a substrate, comprising the steps of:

(a) applying to the surface of a reflective, glossy, and/or luminescent substrate, to form an opaque coating thereon, an opaque coating composition comprising (i) a monomeric polybase and a monomeric polyacid, (ii) a polymeric polybase and a monomeric polyacid, (iii) a monomeric polybase and a polymeric polyacid, or (iv) a combination thereof; and (b) contacting the coated substrate with a recording liquid that renders the opaque coating partially or entirely transparent.

2. The process of claim 1, wherein the image is a metallic-looking image.

3. The process of claim 1, wherein step (a) is repeated at least once, producing a multilayer coating on the substrate.

4. The process of claim 3, wherein at least two different opaque coating compositions are used in the repeated application steps (a).

5. The process of claim 1, wherein the opaque coating composition comprises a monomeric polybase and a monomeric polyacid.

6. The process of claim 5, wherein the monomeric polyacid has the structural formula (I)

$$[R\text{—}(L_x\text{—}COOH)_y]_z \qquad (I)$$

wherein:

R is selected from the group consisting of alkyl, alkenyl, aryl of 1 to 3 rings which may be fused or linked, and 5- and 6-membered heterocyclic rings having from 1 to 3 heteroatoms selected from N, S and O;

L is an alkylene or alkenylene chain containing 1 to 8 carbon atoms;

x is 0 or 1;

y is an integer in the range of 2 to 10 inclusive; and z is 1, 2 or 3, with the provisos that (a) if w is 0 and x is 0, then y is 2 and z is 2, and (b) if z is 2 or 3, the distinct R groups are covalently linked to each other, and the monomeric polybase has the structural formula (II)

$$[R\text{—}(L_x\text{—}NR^1R^2)_y]_z \qquad (II)$$

wherein $R^1$ and $R^2$ are hydrogen, alkyl, alkoxy, or hydroxyl-substituted alkoxy, and R, L, x, y and z are as defined with respect to the monomeric polyacid.

7. The process of claim 6, wherein the monomeric polyacid is selected from the group consisting of oxalic acid, maleic acid, succinic acid, methylsuccinic acid, malonic acid, adipic acid, glutaric acid, fumaric acid, dihydroxyfumaric acid, malic acid, mesaconic acid, itaconic acid, phthalic acid, isophthalic acid, terephthalic acid, 1,2-, 1,3- and 1,4-cyclohexane dicarboxylic acids, 1,2,3-cyclohexane tricarboxylic acid, 1,2,4-cyclohexane tricarboxylic acid, 1,3,5-cyclohexane tricarboxylic acid, 1,2- and 1,3-cyclopentane dicarboxylic acids, citric acid, tartaric acid, dihydroxyterephthalic acid, 1,2,3-, 1,2,4- and 1,2,5-benzene tricarboxylic acids, tricarballylic acid, 1,2,4,5-benzene tetracarboxylic acid, norbornene tetracarboxylic acid, 3,3',4,4'-benzophenone tetracarboxylic acid, 1,2,3,4,5,6-benzene hexacarboxylic acid, aspartic acid, glutamic acid, and combinations thereof.

8. The process of claim 6, wherein the monomeric polybase is selected from the group consisting of ethylenediamine, 1,2-propane diamine, 1,3-propanediamine, 1,2,3-triaminopropane, cis-1,2-cyclohexanediamine, trans-1,2-cyclohexanediamine, 1,3-bis(aminomethyl)cyclohexane, o-, m- and p-phenylenediamine, tetramethyl o-, m- and p-phenylenediamine, hexamethylene-iamine, hexamethylenetetraamine, diethylenetriamine, tetraethylenepentamine, pentaethylene-examine,pentamethyl diethylenetriamine, tris(2-aminoethyl)amine, 1,1,4,7,10,10-hexamethyl triethylenetetramine, tetramethyl-p-phenylenediamine, tetramethylethylenediamine, triethylenetetraamine, 4,4'-bipyridyl, and combinations thereof.

9. The process of claim 7, wherein the monomeric polybase is selected from the group consisting of ethylenediamine, 1,2-propane diamine, 1,3-propanediamine, 1,2,3-triaminopropane, cis-1,2-cyclohexanediamine, trans-1,2-cyclohexanediamine, 1,3-bis(aminomethyl)cyclohexane, o-, m- and p-phenylenediamine, tetramethyl o-, m- and p-phenylenediamine, hexamethylene-iamine, hexamethylenetetraamine, diethylenetriamine, tetraethylenepentamine, pentaethylene-examine, pentamethyl diethylenetriamine, tris(2-aminoethyl)amine, 1, 1,4,7,10,10-hexamethyl triethylenetetramine, tetramethyl-p-phenylenediamine, tetramethylethylenediamine, triethylenetetraamine, 4,4'-bipyridyl, and combinations thereof.

10. The process of claim 1, wherein the opaque coating composition comprises a polymeric polybase and a monomeric polyacid.

11. The process of claim 10, wherein the monomeric polyacid has the structural formula (I)

$$[R-(L_x-COOH)_y]_z \quad (I)$$

wherein:

R is selected from the group consisting of alkyl, alkenyl, aryl of 1 to 3 rings which may be fused or linked, and 5- and 6-membered heterocyclic rings having from 1 to 3 heteroatoms selected from N, S and O;

L is an alkylene or alkenylene chain containing 1 to 8 carbon atoms;

x is 0 or 1;

y is an integer in the range of 2 to 10 inclusive; and z is 1, 2 or 3, with the provisos that (a) if w is 0 and x is 0, then y is 2 and z is 2, and (b) if z is 2 or 3, the distinct R groups are covalently linked to each other, and the polymeric polybase comprises a nitrogenous polymer.

12. The process of claim 11, wherein the monomeric polyacid is selected from the group consisting of oxalic acid, maleic acid, succinic acid, methylsuccinic acid, malonic acid, adipic acid, glutaric acid, fumaric acid, dihydroxyfumaric acid, malic acid, mesaconic acid, itaconic acid, phthalic acid, isophthalic acid, terephthalic acid, 1,2-, 1,3- and 1,4-cyclohexane dicarboxylic acids, 1,2,3-cyclohexane tricarboxylic acid, 1,2,4-cyclohexane tricarboxylic acid, 1,3,5-cyclohexane tricarboxylic acid, 1,2- and 1,3-cyclopentane dicarboxylic acids, citric acid, tartaric acid, dihydroxyterephthalic acid, 1,2,3-, 1,2,4- and 1,2,5-benzene tricarboxylic acids, tricarballylic acid, 1,2,4,5-benzene tetracarboxylic acid, norbornene tetracarboxylic acid, 3,3',4,4'-benzophenone tetracarboxylic acid, 1,2,3,4,5,6-benzene hexacarboxylic acid, aspartic acid, glutamic acid, and combinations thereof.

13. The process of claim 11, wherein the polymeric polybase is selected from the group consisting of polyethyleneimine, polyvinylpyridine, polyallylamine (including N-alkylated and N,N-dialkylated polyallylamines), polyvinylaziridine, polyimidazole, polylysine, chitosan, poly (amino and alkylated amino)ethylenes, ethoxylated polyethyleneimine, propoxylated polyethyleneimine, and combinations thereof.

14. The process of claim 12, wherein the polymeric polybase is selected from the group consisting of polyethyleneimine, polyvinylpyridine, polyallylamine (including N-alkylated and N,N-dialkylated polyallylamines), polyvinylaziridine, polyimidazole, polylysine, chitosan, poly (amino and alkylated amino)ethylenes, ethoxylated polyethyleneimine, propoxylated polyethyleneimine, and combinations thereof.

15. The process of claim 1, wherein the opaque coating composition comprises a monomeric polybase and a polymeric polyacid.

16. The process of claim 15, wherein the polymeric polyacid is a carboxylic acid-containing polymer, and the monomeric polybase has the structural formula (II)

$$[R-(L_x-NR^1R^2)_y]_z \quad (II)$$

wherein:

R is selected from the group consisting of alkyl, alkenyl, aryl of 1 to 3 rings which may be fused or linked, and 5- and 6-membered heterocyclic rings having from 1 to 3 heteroatoms selected from N, S and O;

L is an alkylene or alkenylene chain containing 1 to 8 carbon atoms;

x is 0 or 1;

y is an integer in the range of 2 to 10 inclusive;

z is 1, 2 or 3; and $R^1$ and $R^2$ are hydrogen, alkyl, alkoxy, or hydroxyl-substituted alkoxy, with the provisos that (a) if w is 0 and x is 0, then y is 2 and z is 2, and (b) if z is 2 or 3, the distinct R groups are covalently linked to each other.

17. The process of claim 16, wherein the polymeric polyacid is selected from the group consisting of poly (acrylic acid), poly(acrylonitrile-acrylic acid), poly(styrene-acrylic acid), poly(butadiene-acrylonitrile acrylic acid), poly (butylacrylate-acrylic acid), poly(ethyl acrylate-acrylic acid), poly(ethylene-propylene-acrylic acid), poly(propylene-acrylic acid), alginic acid, phytic acid, and combinations thereof.

18. The process of claim 15, wherein the monomeric polybase is selected from the group consisting of ethylenediamine, 1,2-propane diamine, 1,3-propanediamine, 1,2,3-triaminopropane, cis-1,2-cyclohexanediamine, trans-1,2-cyclohexanediamine, 1,3-bis(aminomethyl)cyclohexane, o-, m- and p-phenylenediamine, tetramethyl o-, m- and p-phenylenediamine, hexamethylenediamine, hexamethylenetetraamine, diethylenetriamine, tetraethylenepentamine, pentaethylenehexamine, pentamethyl diethylenetriamine, tris(2-aminoethyl)amine, 1,1,4,7,10,10-hexamethyl triethylenetetramine, tetramethyl-p-phenylenediamine, tetramethylethylenediamine, triethylenetetraamine, 4,4'-bipyridyl, and combinations thereof.

19. The process of claim 16, wherein the monomeric polybase is selected from the group consisting of ethylenediamine, 1,2-propane diamine, 1,3-propanediamine, 1,2,3-triaminopropane, cis-1,2-cyclohexanediamine, trans-1,2-cyclohexanediamine, 1,3-bis(aminomethyl)cyclohexane, o-, m- and p-phenylenediamine, tetramethyl o-, m- and p-phenylenediamine, hexamethylenediamine, hexamethylenetetraamine, diethylenetriamine, tetraethylenepentamine, pentaethylenehexamine, pentamethyl diethylenetriamine, tris(2-aminoethyl)amine, 1, 1,4,7,10,10-hexamethyl triethylenetetramine, tetramethyl-p-phenylenediamine, tetramethylethylenediamine, triethylenetetraamine, 4,4'-bipyridyl, and combinations thereof.

20. The process of claim 17, wherein the monomeric polybase is selected from the group consisting of ethylenediamine, 1,2-propane diamine, 1,3-propanediamine, 1,2,3-triaminopropane, cis-1,2-cyclohexanediamine, trans-1,2-cyclohexanediamine, 1,3-bis(aminomethyl)cyclohexane, o-, m- and p-phenylenediamine, tetramethyl o-, m- and p-phenylenediamine, hexamethylenediamine, hexamethylenetetraamine, diethylenetriamine, tetraethylenepentamine, pentaethylenehexamine, pentamethyl diethylenetriamine, tris(2-aminoethyl)amine, 1,1,4,7,10,10-hexamethyl triethylenetetramine, tetramethyl-p-phenylenediamine, tetramethylethylenediamine, triethylenetetraamine, 4,4'-bipyridyl, and combinations thereof.

21. The process of claim 1, wherein the opaque coating composition is aqueous.

22. The process of claim 1, wherein the opaque coating composition further includes a film-forming binder.

23. The process of claim 1, wherein the opaque coating composition further includes a colorant.

24. The process of claim 23, wherein the colorant is a pigment.

25. The process of claim 24, wherein the pigment is selected from the group consisting of silica, titanium dioxide, calcium silicate and calcium carbonate.

26. The process of claim 23, wherein the colorant is a dye.

27. The process of claim 1, wherein the polyacid and polybase taken together represents approximately 5 wt. % to approximately 95 wt. % of the opaque coating composition, based upon total solids weight of the composition after drying.

28. The process of claim 22, wherein the film-forming binder represents approximately 1 wt. % to approximately 40 wt. % of the opaque coating composition.

29. The process of claim 28, wherein the film-forming binder represents approximately 1 wt. % to approximately 25 wt. % of the opaque coating composition.

30. The process of claim 29, wherein the film-forming binder represents approximately 1 wt. % to approximately 15 wt. % of the opaque coating composition.

31. The process of claim 1, wherein the opaque coating composition further includes an optical brightener.

32. The process of claim 31, wherein the optical brightener represents approximately 0.01 wt. % to approximately 20 wt. % of the opaque coating composition.

33. The process of claim 1, wherein the opaque coating composition further includes a crosslinking agent.

34. The process of claim 33, wherein the crosslinking agent is ammonium zirconyl carbonate.

35. The process of claim 33, wherein the crosslinking agent is zirconium acetate.

36. The process of claim 1, wherein the surface of the substrate is reflective.

37. The process of claim 36, wherein the reflective surface is metallic.

38. The process of claim 36, wherein the substrate is a paper/foil laminate.

39. The process of claim 36, wherein the substrate is a metallized film.

40. The process of claim 1, wherein step (b) is performed using a writing instrument.

41. A substrate having a glossy, reflective, and/or luminescent surface coated with an opaque coating composition that becomes partially or entirely transparent upon contact with a recording liquid, wherein the opaque coating composition comprises a polyacid and a polybase.

42. The coated substrate of claim 41, wherein the substrate has a reflective surface.

43. The coated substrate of claim 42, wherein the reflective surface is metallic.

44. The coated substrate of claim 42, wherein the reflective surface is holographic.

45. The coated substrate of claim 41, wherein the substrate is comprised of a paper/foil laminate.

46. A process for producing an image comprising the steps of:

(a) printing an image on a reflective, glossy, and/or luminescent substrate;

(b) applying an opaque coating composition to the substrate, over the image, to form an opaque coating thereon; and (c) contacting the coated substrate with a recording liquid that renders the opaque coating partially or entirely transparent wherein the opaque composition comprises (i) a monomeric polybase and a monomeric polyacid, (ii) a polymeric polybase and a monomeric polyacid, (iii) a monomeric polybase and a polymeric polyacid, or (iv) a combination thereof.

47. The process of claim 46, wherein the opaque coating composition further includes a colorant.

48. The process of claim 46, wherein the substrate has a reflective surface.

49. The process of claim 48, wherein the reflective surface is metallic.

50. The process of claim 48, wherein the reflective surface is holographic.

51. The process of claim 46, wherein the substrate is comprised of a paper/foil laminate.

52. The process of claim 46, wherein the substrate is comprised of a metallized film.

53. The process of claim 46, wherein step (c) is carried out using a writing instrument.

54. A light-emitting, reflective, and/or luminescent substrate coated with an opaque coating composition that becomes partially or entirely transparent upon contact with a recording liquid, wherein the opaque coating composition comprises a polyacid and a polybase.

55. The coated substrate of claim 54, wherein the substrate has a reflective surface.

56. The coated substrate of claim 55, wherein the reflective surface is metallic.

57. The coated substrate of claim 55, wherein the reflective surface is holographic.

58. The coated substrate of claim 55, wherein the substrate is comprised of a paper/foil laminate.

59. The coated substrate of claim 55, wherein the substrate is comprised of a metallized film.

* * * * *